(12) United States Patent
Yoneda et al.

(10) Patent No.: US 7,214,653 B2
(45) Date of Patent: May 8, 2007

(54) POLYALKYLENEIMINE ALKYLENEOXIDE COPOLYMER

(75) Inventors: Atsuro Yoneda, Toyonaka (JP); Yoshikazu Fujii, Suita (JP); Shigeru Yamaguchi, Yao (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/948,268

(22) Filed: Sep. 24, 2004

(65) Prior Publication Data

US 2005/0085404 A1   Apr. 21, 2005

(30) Foreign Application Priority Data

Sep. 24, 2003 (JP) ............................. 2003-331973
May 10, 2004 (JP) ............................. 2004-140385

(51) Int. Cl.
*C11D 3/37* (2006.01)

(52) U.S. Cl. ..................... 510/476; 510/475
(58) Field of Classification Search ............... 510/475, 510/476; 528/421
See application file for complete search history.

(56) References Cited

U.S. PATENT DOCUMENTS

| 4,597,898 A | 7/1986 | Vander Meer |
| 4,689,167 A | 8/1987 | Collins et al. |

FOREIGN PATENT DOCUMENTS

| DE | 2 165 900 A | 7/1973 |
| JP | 59 17 46 93 | 10/1984 |
| JP | 7-116473 | 11/1987 |
| JP | 11-508318 A1 | 7/1999 |
| JP | 11-269239 | * 10/1999 |
| JP | 2002-518585 A | 6/2002 |
| WO | WO-97/42293 A1 | 11/1997 |
| WO | WO-99/67353 A1 | 12/1999 |

OTHER PUBLICATIONS

"Polyethyleneimine", *Romp Chemie Lexikon* 1992, pp. 3532-3533.

* cited by examiner

*Primary Examiner*—John R. Hardee
(74) *Attorney, Agent, or Firm*—Connolly, Bove, Lodge & Hutz, LLP

(57) ABSTRACT

It is an object of the present invention to provide a polyalkyleneimine alkyleneoxide copolymer, which is suitably used as a builders for a detergent, a detergent, a water treatment agent, a dispersant and the like and which can exert high basic performance in point of the detergency or the like, a production method thereof, and use thereof.

The present invention is directed to a polyalkyleneimine alkyleneoxide copolymer comprising an alkyleneimine monomer unit having polyalkyleneoxide, wherein the polyalkyleneoxide has an end structure containing at least one selected from the group consisting of:

(1) —CO—$R^2$—COOX;
(2) —$CH_2$CH(OH)—$R^3$;
(3) —$CH_2$CH(OH)$CH_2$—O—$R^4$; and
(4) —C(O)—NH—$R^5$, wherein $R^2$ represents an alkylene group having 2 to 8 carbon atoms, an alkenylene group having 2 to 8 carbon atoms, an arylene group having 6 to 14 carbon atoms or a sulfoalkylene group having 2 to 8 carbon atoms; $R^3$ represents an alkenyl group having 2 to 6 carbon atoms, an aryl group having 6 to 14 carbon atoms, a sulfoalkyl group having 2 to 6 carbon atoms or a hydroxyalkyl group having 2 to 6 carbon atoms; $R^4$ represents a hydrogen atom, an alkyl group having 2 to 8 carbon atoms, an alkenyl group having 2 to 6 carbon atoms, an aryl group having 6 to 14 carbon atoms or a sulfoalkyl group having 2 to 6 carbon atoms; $R^5$ represents an alkyl group having 2 to 8 carbon atoms, an alkenyl group having 2 to 8 carbon atoms, an aryl group having 6 to 14 carbon atoms or a sulfoalkyl group having 2 to 6 carbon atoms; and X represents a hydrogen atom, an alkaline metal atom, an alkaline earth metal atom, an ammonium group or an organic ammonium group.

3 Claims, No Drawings

POLYALKYLENEIMINE ALKYLENEOXIDE COPOLYMER

TECHNICAL FIELD

The present invention relates to a polyalkyleneimine alkyleneoxide copolymer. More particularly, the present invention relates to a polyalkyleneimine alkyleneoxide copolymer, which is suitable for a builder for a detergent, a detergent, a water treatment agent, a dispersant and the like and which exhibits high detergency, for example, when being used as a builder for a detergent in combination with an activator, a production method thereof, and use thereof.

BACKGROUND ART

A polymer which has a main chain of polyalkyleneimine and formed by adding ethyleneoxide or the like to a nitrogen atom in polyalkyleneimine is also referred to as modified polyethyleneimine ethoxylate and can act, for example, as a polymer-based builder. Such a polymer is indispensable as a component constituting a liquid detergent since it has a property of being soluble in the liquid detergent. When the modified polyethyleneimine ethoxylate is comprised together with an activator in a detergent, the detergent will prevent recontamination due to soil having been removed by washing to exhibit high detergency.

With respect to such a detergent containing modified polyethyleneimine ethoxylate, JP Kokai Publication Hei 7-116473 (p. 8–10) discloses a builder composition for a detergent, which comprises an ethoxylated amine dispersant/redeposition inhibitor. This ethoxylated amine has an alkyleneoxide adduct represented by —[($R^5$O)m($CH_2CH_2$O)n]- (wherein $R^5$ is $C_3$–$C_4$ alkylene or hydroxyalkylene, preferably propylene; when this amine is polyamine and an amine polymer, m is 0 to 10 and n is at least 3; and these polyoxyalkylene portions can be mixed to form a block), and is a polymer in which an end structure of the alkyleneoxide adduct is a soluble nonion group, an anion group and a mixture thereof. Examples of the nonion group may comprises $C_1$–$C_4$ alkyl groups, hydroxyalkyl ester groups, ether groups, hydrogen, acetate and methyl ether, and examples of the anion group may comprises $PO_3^{2-}$ and $SO_3^-$.

JP Kohyo Publication Hei 11-508318 (p. 46–55) discloses a liquid washing detergent composition containing water soluble and/or dispersible modified polyamine having a functional main chain portion, which exerts an effect of releasing cotton soil. This modified polyamine is a polymer having an alkyleneoxide adduct represented by —($R^1$O)mB (wherein $R^1$ is $C_2$–$C_6$ alkylene and a mixture thereof, preferably ethylene; and m has a value of 4 to about 400), and an end structure of the alkyleneoxide adduct, represented by B, is hydrogen, $C_1$–$C_6$ alkyls, —$(CH_2)_q SO_3 M$, —$(CH_2)_p CO_2 M$, —$(CH_2)_q (CHSO_3 M)CH_2 SO_3 M$, —$(CH_2)_q (CHSO_2 M)CH_2 SO_3 M$, —$(CH_2)_p PO_3 M$, —$PO_3 M$ (wherein M is a hydrogen or a water-soluble cation, which is sufficient for satisfying charge balance; p has a value of 1 to 6; and q has a value of 0 to 6).

Further, JP Kohyo Publication 2002-518585 (p. 11–16) discloses a washing detergent composition comprising alkoxylated polyalkyleneimine. This alkoxylated polyalkyleneimine is a polymer having an alkyleneoxide adduct represented by —($R^1$O)m($R^2$O)n$R^3$ (wherein $R^1$ is 1,2-propylene, 1,2-butylene and a mixture thereof, preferably 1,2-propylene; $R^2$ is ethylene; $R^3$ is hydrogen, $C_1$–$C_4$ alkyls and a mixture thereof, preferably hydrogen or methyl, more preferably hydrogen; m is about 1 to about 10; and n is about 10 to about 40.), and an end structure of the alkyleneoxide adduct is hydrogen, $C_1$–$C_4$ alkyls and a mixture thereof.

However, in these prior arts, when the polymer is used in the use of a detergent, there was a room to contrive the structure of the polymer having an alkyleneoxide adduct for the purpose of improving the detergency by rendering the polymer more favorable as a high polymer-based builder to adequately prevent recontamination or for the purpose of improving basic performance in another uses.

SUMMARY OF THE INVENTION

The present invention has been made in view of the above-mentioned state of the art, and it is an object of the present invention to provide a polyalkyleneimine alkyleneoxide copolymer, which is suitably used as a builders for a detergent, a detergent, a water treatment agent, a dispersant and the like and which can exert high basic performance in point of the detergency or the like, a production method thereof, and use thereof.

The present inventors made various investingations concerning modified polyethyleneimine ethoxylate having an alkyleneoxide adduct and consequently have noted that in such a polymer, an end structure generally has a structure of a hydroxyl group (—OH) derived from an end structure of alkyleneoxide, but when the end structure is change from the hydroxyl group to another hydrophilic group or conversely to a hydrophobic group, the polymer exhibits effects differing from the conventional one. As a result, the present inventors have reached an idea that it is possible to solve the above-mentioned problems by changing a part or all of the end structure to a specific structure other than that of the hydroxyl group. For example in the case of using such a polymer in the field of a detergent, the polymer is considered to adhere to the surface of cloth such as cotton by the effect of a cationic property resulting from polyethyleneimine. In this case, the contamination (soil) such as dirt is prevented from redepositing on cloth by the effect of a steric structure of the alkyleneoxide adduct, and when a specific hydrophobic group is used for the end structure of the polymer, the contamination such as dirt becomes resistant to adhering to the cloth because of hydrophilicity of the contamination such as dirt, and these effects are synergistically exerted, resulting in an improvement in a basic performance such as detergency. Further, the present inventors have found that the above effects were exhibited if the above-mentioned polymer is produced by reacting a polyalkyleneimine alkyleneoxide copolymer with a specific compound and that such a polymer was suitable in application to a builder for a detergent, a detergent, a water treatment agent, a dispersant and the like. These findings have led to completion of the present invention.

That is, the present invention is directed to a polyalkyleneimine alkyleneoxide copolymer comprising an alkyleneimine monomer unit having polyalkyleneoxide, wherein
the polyalkyleneoxide has an end structure comprising at least one selected from the group consisting of:
(1) —CO—$R^2$—COOX;
(2) —$CH_2CH(OH)$—$R^3$;
(3) —$CH_2CH(OH)CH_2$—O—$R^4$; and
(4) —C(O)—NH—$R^5$, wherein $R^2$ represents an alkylene group having 2 to 8 carbon atoms, an alkenylene group having 2 to 8 carbon atoms, an arylene group having 6 to 14 carbon atoms or a sulfoalkylene group having 2 to 8 carbon atoms; $R^3$ represents an alkenyl group having 2 to 6 carbon atoms, an aryl group having 6 to 14 carbon atoms, a sulfoalkyl group having 2 to 6 carbon atoms or a hydroxyalkyl group having 2 to 6 carbon atoms; $R^4$ represents a hydrogen atom, an alkyl group having 2 to 8 carbon atoms, an alkenyl group having 2 to 6 carbon atoms, an aryl group having 6 to 14 carbon atoms or a sulfoalkyl group having 2 to 6 carbon atoms; $R^5$ represents an alkyl group having 2 to 8 carbon atoms, an alkenyl group having 2 to 8 carbon atoms, an aryl group having 6 to 14 carbon atoms or a sulfoalkyl group having 2 to 6 carbon atoms; and X represents a hydrogen atom, an alkaline metal atom, an alkaline earth metal atom, an ammonium group or an organic ammonium group.

DETAILED DESCRIPTION OF THE INVENTION

Hereinafter, the present invention will be described in detail.

A polyalkyleneimine alkyleneoxide copolymer of the present invention is a copolymer comprising an alkyleneimine monomer unit having polyalkyleneoxide as an essential repeat unit. Such a copolymer has a structure in which an oxyalkylene group is added to a nitrogen atom of a polyalkyleneimine unit composed of alkyleneimine.

Average number of moles of addition of the oxyalkylene group to the polyalkyleneimine unit is preferably not less than 2 and not more than 200, and the number of moles of addition is generally distributed. That is, the number of moles of addition to the polyalkyleneimine unit is 1 or 2 or more and it is preferred that average number of moles of addition is not less than 2 and not more than 200. More preferably, it is not less than 3 and not more than 100, still more preferably not less than 4 and not more than 80, and particularly preferably not less than 5 and not more than 50. There may be some units not having the structure, in which an oxyalkylene group is added, among a plurality of polyalkyleneimine units.

Average number of moles of addition refers to an average number of moles of oxyalkylene groups added to 1 mole of a polyalkyleneimine unit.

According to the present invention, in the above-mentioned polyalkyleneimine alkyleneoxide copolymer, an end structure of the polyalkyleneoxide of the alkyleneimine monomer unit contains at least one selected from the group consisting of the groups (1) to (4) as an essential component. That is, part of or all of the structure located at an end of the group composed through addition of an oxyalkylene group becomes one or two or more kinds of the groups (1) to (4).

In the group (1), as an alkylene group having 2 to 8 carbon atoms in $R^2$, an ethylene group, a trimethylene group, a hexamethylene group and the like are suitable. As an alkenylene group having 2 to 8 carbon atoms, an ethenylene (vinylene) group, a propenylene group and the like are suitable. As an arylene group having 6 to 14 carbon atoms, an o-phenylene group, a m-phenylene group, ap-phenylene group and the like are suitable. As a sulfoalkylene group having 2 to 8 carbon atoms, a sulfoethylene group, a 1-methylsulfoethylene group and the like are suitable.

As an alkaline metal atom in X, alkaline metals such as a lithium atom, a sodium atom and a potassium atom are suitable, and as an alkaline earth metal atom, alkaline earth metals such as calcium atom and magnesium atom are suitable. As an organic ammonium group (an organic amine group), alkanol amines such as an ethanolamine group, a diethanolamine group and a triethanol amine group, and a triethylamine group are suitable. Further, an ammonium group may be used.

In the above-mentioned formulas (2) to (4), as an alkenyl group having 2 to 6 carbon atoms in $R^3$, a vinyl group, a propenyl group and the like are suitable, and as an aryl group having 6 to 14 carbon atoms, a phenyl group, a tolyl group and the like are suitable. As a sulfoalkyl group having 2 to 6 carbon atoms, a sulfoethyl group is suitable, and as a hydroxyalkyl group having 2 to 6 carbon atoms, a hydroxyethyl group is suitable.

As an alkyl group having 2 to 8 carbon atoms in $R^4$, a butyl group, a 2-ethylhexyl group and the like are suitable. As an alkenyl group having 2 to 6 carbon atoms, an allyl group and the like are suitable. As an aryl group having 6 to 14 carbon atoms, a phenyl group and a tolyl group are suitable. As a sulfoalkyl group having 2 to 6 carbon atoms, a sulfoethyl group is suitable, and as a hydroxyalkyl group having 2 to 6 carbon atoms, a hydroxyethyl group is suitable.

As an alkyl group having 2 to 8 carbon atoms in $R^5$, a hexyl group and the like are suitable. As an alkenyl group having 2 to 8 carbon atoms, a butenyl group and the like are suitable. As an aryl group having 6 to 14 carbon atoms, a phenyl group, a tolyl group and the like are suitable. As a sulfoalkyl group having 2 to 6 carbon atoms, a sulfoethyl group, a sulfopropyl group and the like are suitable.

In the polyalkyleneimine alkyleneoxide copolymer of the present invention, a content of the end structure selected from the group consisting of the above-mentioned groups (1) to (4) is preferably not less than 5 mol % and not more than 100 mol % with respect to 100 mol % of all end structures of polyalkyleneoxide. More preferably, the content of the end structure is not less than 10 mol % and not more than 99 mol %, still more preferably not less than 20 mol % and not more than 98 mol %, particularly preferably not less than 30 mol % and not more than 97 mol %, and most preferably not less than 40 mol % and not more than 95 mol %. When it is less than 5 mol %, for example, there is a possibility that a basic performance such as detergency cannot be adequately improved when the polyalkyleneimine alkyleneoxide copolymer is used in the field of a detergent. A mol % of an end structure can be measured by $^1$H-NMR or a yield of a copolymer after purification.

The present invention is also directed to a production method of polyalkyleneimine alkyleneoxide copolymer, which comprises reacting polyalkyleneimine alkyleneoxide copolymer through at least one step selected from the group consisting of:

(1) a step of reacting with a cyclic anhydride in a molecule of polycarboxylic acid;

(2) a step of reacting with aryl epoxyethane or epoxy alkylene having 2 to 6 carbon atoms;

(3) a step of reacting with glycidol, alkyl glycidyl ether, alkenyl glycidyl ether or aryl glycidyl ether;

(4) a step of reacting with alkyl isocyanate, alkenyl isocyanate or aryl isocyanate;

(5) a step of reacting with hydrogensulfite salt and/or sulfite salt after the step (1); and (6) a step of reacting with hydrogensulfite salt and/or sulfite salt in the presence of a radical source or oxygen after the step (2), (3) or (4).

In the present invention, it is possible to react the polyalkyleneimine alkyleneoxide copolymer through at least one step of the steps (1) to (4), but it is also possible to react the copolymer through the step (5) or the step (6). That is, as an embodiment of the present invention, there can be given an embodiment of reacting the copolymer through at least one step of the steps (1) to (4), or an embodiment of reacting the copolymer through at least two steps like the step (5) or (6).

In the above-mentioned steps, it is preferred to obtain the polyalkyleneimine alkyleneoxide copolymer of the present invention described above by reacting a polyalkyleneimine alkyleneoxide copolymer, having a hydroxyl group (—OH) derived from alkyleneoxide at its ends, through at least one step selected from the group consisting of the steps (1) to (6). In this case, part of or all of the hydroxyl group of the copolymer at the end of polyalkyleneoxide will be changed to the above-mentioned end structure. Hereinafter, a polyalkyleneimine alkyleneoxide copolymer which is not yet reacted is also referred to as a hydroxyl group unmodified polyalkyleneimine alkyleneoxide copolymer.

In the above-mentioned step (1), it is possible to react the copolymer using one kind or two or more kinds of cyclic anhydrides in a molecule of polycarboxylic acids. As the cyclic anhydride in a molecule of polycarboxylic acid, succinic anhydride, maleic anhydride, phthalic anhydride, trimellitic anhydride, cis-Δ4-tetrahydrophthalic anhydride, itaconic anhydride and the like are suitable. A polyalkyleneimine alkyleneoxide copolymer having an end structure of the above-mentioned group (1) can be obtained by a production method comprising the above-mentioned step (1).

In the above-mentioned step (2), it is possible to react the copolymer using one kind or two or more kinds of aryl epoxyethane and epoxy alkylene having 2 to 6 carbon atoms. As the aryl epoxyethane, styrene oxide and the like are suitable. As the epoxy alkylene having 2 to 6 carbon atoms, 3,4-epoxy-1-butene and the like are suitable. A polyalkyleneimine alkyleneoxide copolymer having an end structure of the above-mentioned group (2) can be obtained by a production method comprising the above-mentioned step (2).

In the above-mentioned step (3), it is possible to react the copolymer using one kind or two or more kinds of glycidol, alkyl glycidyl ether, alkenyl glycidyl ether and aryl glycidyl ether. As the alkyl glycidyl ether, butyl glycidyl ether and the like are suitable. As the alkenyl glycidyl ether, allyl glycidyl ether and the like are suitable. As aryl glycidyl ether, phenyl glycidyl ether and the like are suitable. A polyalkyleneimine alkyleneoxide copolymer having an end structure of the above-mentioned group (3) can be obtained by a production method comprising the above-mentioned step (3).

In the above-mentioned step (4), it is possible to react the copolymer using one kind or two or more kinds of alkyl isocyanate, alkenyl isocyanate and aryl isocyanate. As the alkyl isocyanate, hexyl isocyanate and the like are suitable. As the aryl isocyanate, phenyl isocyanate and the like are suitable. A polyalkyleneimine alkyleneoxide copolymer having an end structure of the above-mentioned group (4) can be obtained by a production method comprising the above-mentioned step (4).

In the above-mentioned step (5), it is possible to react a polyalkyleneimine alkyleneoxide copolymer having an end structure of an alkenylene group of the above-mentioned group (1), which has been obtained in the above-mentioned step (1), using one or two kinds of hydrogensulfite salt and sulfite salt. As the polyalkyleneimine alkyleneoxide copolymer having an end structure of an alkenylene group of the above-mentioned group (1), a reaction product of maleic anhydride and a polyalkyleneimine alkyleneoxide copolymer is suitable. A polyalkyleneimine alkyleneoxide copolymer having an end structure of a sulfoalkylene group of the above-mentioned group (1) can be obtained by a production method comprising the above-mentioned step (5).

In the above-mentioned step (6), it is possible to react a polyalkyleneimine alkyleneoxide copolymer having an end structure of an alkenyl group of the above-mentioned group (2), (3) or (4), which has been obtained in the above-mentioned step (2), (3) or (4), using one or two kinds of hydrogensulfite salt and sulfite salt. As the polyalkyleneimine alkyleneoxide copolymer having an end structure of an alkenyl group of the above-mentioned group (2), a reaction product of 3,4-epoxy-1-butene and a polyalkyleneimine alkyleneoxide copolymer is suitable. As the polyalkyleneimine alkyleneoxide copolymer having an end structure of an alkenyl group of the above-mentioned group (3), a reaction product of aryl glycidyl ether and a polyalkyleneimine alkyleneoxide copolymer is suitable. As the polyalkyleneimine alkyleneoxide copolymer containing an end structure of an alkenyl group of the above-mentioned group (4), a reaction product of allyl isocyanate and a polyalkyleneimine alkyleneoxide copolymer is suitable. A polyalkyleneimine alkyleneoxide copolymer having an end structure of a sulfoalkyl group of the above-mentioned group (2), (3) or (4) can be obtained by a production method comprising the above-mentioned step (6).

Further, in the above-mentioned step (6), it is also possible to employ a reaction form of, for example, reacting the copolymer with sulfite salt after reacting with epoxy alkylene having 2 to 6 carbon atoms or alkenyl glycidyl ether.

As the above-mentioned production method of polyalkyleneimine alkyleneoxide copolymer, preferred is a production method comprising the steps of obtaining polyalkyleneimine having a main chain of polyamine by polymerizing alkyleneimine; the steps of obtaining a polyalkyleneimine alkyleneoxide copolymer having a hydroxyl group derived from alkyleneoxide at its ends by adding alkyleneoxide to polyalkyleneimine; and the steps of obtaining a polyalkyleneimine alkyleneoxide copolymer by reacting the polyalkyleneimine alkyleneoxide copolymer through at least one step selected from the group consisting of the above-mentioned steps (1) to (6).

Reaction conditions under which the above-mentioned steps (1) to (6) are conducted may be appropriately set depending on a compound to be used in a reaction or an end structure of the intended polymer and the like, and for example, as for a reaction temperature, a reaction is preferably conducted at a temperature in a range of 0 to 200° C. This temperature is more preferably not less than 5° C. and not more than 150° C., still more preferably not less than 10° C. and not more than 120° C., particularly preferably not less than 15° C. and not more than 100° C., and most preferably not less than 20° C. and not more than 80° C. A reaction time is preferably 1 to 100 hours. More preferably, it is not less than 2 and not more than 50 hours, still more preferably not less than 3 hours and not more than 30 hours, and particularly preferably not less than 4 hours and not more than 25 hours.

In the above-mentioned steps (1) to (6), it is preferred that the molar ratio of polyalkyleneimine-alkyleneoxide used for a reaction to a raw material to be reacted with the polyalkyleneimine-alkyleneoxide (polyalkyleneimine-alkyleneoxide/a raw material to be reacted with the polyalkyleneimine-alkyleneoxide) is in a range of 50/1 to 1/50. The above-mentioned molar ratio is more preferably in a range of 40/1 to 1/40, still more preferably a range of 30/1 to 1/30, particularly preferably a range of 20/1 to 1/20, and most preferably a range of 15/1 to 1/15.

The above-mentioned steps (1) to (6) may be conducted in an atmosphere of air or in an atmosphere of inert gas. However, as for the step (6), it is more preferred that it is conducted in an atmosphere of air.

As for the steps (1) to (4), after the polyalkyleneimine-alkyleneoxide is charged into a reactor, the raw material to be reacted with the polyalkyleneimine-alkyleneoxide may be added at one operation or may be added in sequence, but sequential addition is preferred. Further, it is preferred not to use a solvent during a reaction, but a reaction can also be conducted with using a solvent.

As for the above-mentioned step (5), for example, after the polyalkyleneimine alkyleneoxide copolymer having an end structure of an alkenyl group is charged into a reactor, hydrogensulfite salt and/or sulfite salt may be added at one operation or may be added in sequence, but sequential addition is preferred. A solvent is preferably an aqueous solvent such as water, alcohol, glycol, glycerin or polyethylene glycol, and water is particularly preferable. These solvents may be used alone or in combination of two or more kinds. Preferably, a reaction solution has a pH of 6 to 10 at 25° C., and more preferably a pH of 7 to 9. A reaction temperature is preferably 10 to 60° C. and more preferably 20 to 40° C.

As for the above-mentioned step (6), for example, after the polyalkyleneimine alkyleneoxide copolymer having an end structure of an alkenyl group is charged into a reactor, hydrogensulfite salt and/or sulfite salt may be added at one operation or may be added in sequence, but sequential addition is preferred. As a radical source, persulfate is preferred. This may be added at one operation or may be added in sequence, but sequential addition is preferred. As for oxygen, air or oxygen may be bubbled or a reaction may be only conducted in an atmosphere of air. A solvent is preferably an aqueous solvent such as water, alcohol, glycol, glycerin or polyethylene glycol, water is particularly preferable. These solvents may be used alone or in combination of two or more kinds. Preferably, a reaction solution has a pH of 4 to 10 at 25° C., more preferably a pH of 6 to 10, and still more preferably a pH of 7 to 10. A reaction temperature is preferably 10 to 60° C. and more preferably 20 to 40° C.

A preferred embodiment of the polyalkyleneimine alkyleneoxide copolymer of the present invention will be described.

The preferred embodiment of the above-mentioned copolymer is conceptually represented by the following general formula (1):

  (1)

(wherein $R^1$Os are same or different and each represents alkyleneoxide having 2 to 6 carbon atoms, and AI represents an alkyleneimine monomer unit, and $(AI)_y$ represents a polyamine main chain having a structure in which the alkyleneimine monomer units are combined in the form of a straight chain, in cyclic form, in a branched form or in a combination of these forms) The above-mentioned general formula shows conceptually that part of or all of polyalkyleneimine polymer have a polyalkyleneoxide unit represented by $Q^1$-$(R^1O)x$- or —$(R^1O)z$-$Q^2$. $Q^1$ and $Q^2$, which are the end structures of the polyalkyleneoxide unit, are same or different and each represents either of a hydrogen atom or the end structure of the above-mentioned groups (1) to (4), and at least one of them is any one of the end structure of the above-mentioned groups (1) to (4). x, y and z are same or different and each represents an integer of 2 or more.

In the above-mentioned general formula (1), the respective $R^1$O s may be one kind or may be two or more kinds. As the $R^1$O, ethylene oxide and propylene oxide are preferred, and ethylene oxide is more preferred.

As a copolymer represented by the above-mentioned general formula (1), there is suitably used a copolymer obtained by substituting a polyalkyleneoxide unit for a hydrogen atom bonding with a nitrogen atom in amine of polyamine having a structure represented by the following general formula (2), that is, a copolymer obtained by adding alkyleneoxide to a nitrogen atom in amine of polyamine having a structure represented by the following general formula (2):

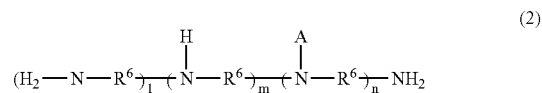  (2)

(wherein $R^6$s are same or different and each represents straight alkylene groups having 2 to 6 carbon atoms or branched alkylene groups having 3 to 6 carbon atoms; A represents another polyamine chain branched, and l, m and n are same or different and each represents an integer of 0 or 1 or more). Herein, at least 2 or more of units —N—$R^6$— will exist in polyamine.

In the above-mentioned general formula (2), it is preferred that another polyamine chain represented by A binds with the structure represented by the general formula (2) through the intermediary of $R^6$s.

In the above-mentioned polyamine, alkylene groups in $R^6$s may be one kind or may be two or more kinds, but one kind of $R^6$s is preferred and an ethylene group is preferred. Further, when $R^6$ is a branched alkylene group having 3 to 6 carbon atoms, a 1,2-propylene group is suitable.

The above-mentioned polyamine comprises at least one kind selected from the group consisting of a unit derived from a nitrogen atom in primary amine, a unit derived from a nitrogen atom in secondary amine and a unit derived from a nitrogen atom in tertiary amine.

The above-mentioned unit derived from a nitrogen atom in primary amine is represented, for example, by the following formulae:

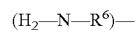

and

—$NH_2$

The above-mentioned unit derived from a nitrogen atom in secondary amine is represented, for example, by the following formula:

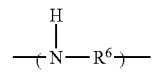

The above-mentioned unit derived from a nitrogen atom in tertiary amine is represented, for example, by the following formula

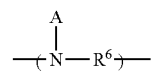

In the above-mentioned polyamine, the form of existence of the above-mentioned units is not particularly limited and, for example, the polyamine contains the above-mentioned units located in a random manner. Further, the above-mentioned nitrogen atom in amine may be quaternized or oxidized.

In the polyalkyleneimine alkyleneoxide copolymer, the copolymer has the form in which part of or all of hydrogen atoms, which a nitrogen atom in amine have, is replaced with a polyalkyleneoxide unit (poly(oxyalkylene) group) in part of or all of these nitrogen atoms in amines.

The above-mentioned polyalkyleneoxide unit is preferably represented by the following general formula (3):

(wherein $R^1O$ is identical to the above description, and a represents an integer of 2 or more). A main chain of polyamine, which comprises the polyalkyleneoxide unit of the above-mentioned general formula (3), comprises a hydroxyl group in an end structure. In such a hydroxyl group unmodified polyalkyleneimine alkyleneoxide copolymer, a hydroxyl group of its ends, derived from alkyleneoxide can be changed by reacting the copolymer through at least one step selected from the group consisting of the above-mentioned steps (1) to (6).

As the polyamine which can form the above-mentioned main chain of polyamine, polyalkylene amine (PAA) and polyalkyleneimine (PAI) are suitable.

Examples of the above-mentioned polyalkylene amine (PAA) may comprise polyethylene amine (PEA) and tetrabutylenepentamine. PEA can be obtained by reacting ammonia and ethylene dichloride and then applying fractional distillation. PEAs, obtained by such a method, comprises triethylenetetramine (TETA) and tetraethylenepentamine (TEPA).

As the above-mentioned polyalkyleneimine, there are suitably used a monopolymer or a copolymer of alkylene imines such as ethyleneimine, propylenimine, 1,2-butyleneimine, 2,3-butyleneimine and 1,1-dimethylethyleneimine, which are obtained by polymerizing one or two or more kinds of alkylene imines having 2 to 6 carbon atoms such as the above-mentioned alkylene imines, using a normal method. These maybe used alone or in combination of two or more kinds. A monopolymer of ethyleneimine (polyethyleneimine; PEI) is more preferable. In a monopolymer or a copolymer of these alkylene imines, a polyalkyleneimine chain is formed and the polyalkyleneimine chain essentially comprises a branched structure. As for PEI, a polymer having a branch which is at least of a medium degree, namely, a polymer having the m-to-n ratio (m/n ratio) of from 4/1 to 1/4 is preferred. The m-to-n ratio is more preferably 3/1 to 1/3, and furthermore preferably 2/1 to 1/2.

In addition, the polyalkyleneimine may be obtained by polymerizing ethylenediamine, diethylenetriamine, triethylenetetramine, tetraethylenepentamine and the like. Such polyalkyleneimines generally have a primary amino group and/or a secondary amino group (an imino group) in addition to a tertiary amino group in their structure.

In the present invention, a main chain of polyamine is preferably formed with ethyleneimine as the main constituent. In this case, "the main constituent" refers to one constituting most of moles of total alkylene imine when the main chain of polyamine is formed from two or more kinds of alkylene imine.

When the above-mentioned "constituting most of" is expressed by mol %, mol % of ethyleneimine per 100 mol % of the total alkylene imine is preferably 50 to 100 mol %. When it is less than 5 mol %, the detergency of the polyalkyleneimine alkyleneoxide copolymer may be deteriorated. More preferably, it is not less than 60 mol %, and still more preferably not less than 70 mol %.

The relative proportions of the respective units derived from a nitrogen atom in primary amine, a nitrogen atom in secondary amine and a nitrogen atom in tertiary amine in the above-mentioned polyamine main chain, particularly in the case of PEI, can be appropriately selected depending on a production method. PEI can be produced by polymerizing ethyleneimine in the presence of a catalyst such as carbon dioxide, sodium hydrogensulfite, sulfuric acid, hydrogen peroxide, hydrochloric acid and acetic acid.

The above-mentioned hydroxyl group unmodified polyalkyleneimine alkyleneoxide copolymer is preferably one obtained by adding alkyleneoxide to polyalkyleneimine as described above, and in this case, an average molecular weight of the polyalkyleneimine is preferably in a range of 200 to 20000. More preferably, it is not less than 300 and not more than 10000, still more preferably not less than 400 and not more than 5000, and particularly preferably not less than 500 and not more than 2000. In addition, average number of moles of addition of an oxyalkylene group is preferably not less than 2 and not more than 200. More preferably, it is in not less than 3 and not more than 100, still more preferably not less than 4 and not more than 80, and particularly preferably not less than 5 and not more than 50.

As a unit of the above-mentioned alkyleneoxide, ethylene oxide, propylene oxide and butylenes oxide are preferred. Ethylene oxide is more preferred.

A preferred embodiment of the polyalkyleneimine alkyleneoxide copolymer of the present invention is represented by the following general formula:

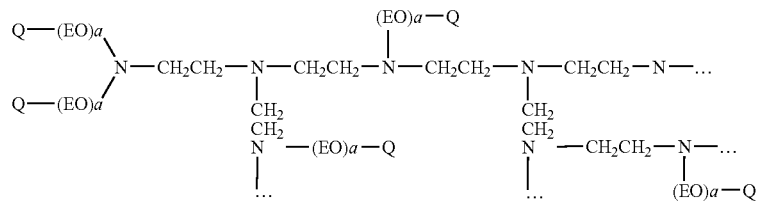

(wherein EO represents ethylene oxide, Qs are same or different and each represents a hydrogen atom or the end structure of the above-mentioned groups (1) to (4), and a is an integer of 2 or more). Herein, the expression " . . . " in the above-mentioned formula means that the same polymerizing chain is repeated.

The copolymer represented by the above-mentioned general formula is a copolymer which comprises a plurality of poly(oxyethylene) groups (—$(CH_2CH_2O)_aH$) formed by adding polyethylene oxide to a nitrogen atom in amine of a PEI main chain and has at least one end structure selected from the group consisting of the above-mentioned groups (1) to (4).

The above-mentioned polyalkyleneimine alkyleneoxide copolymer can be suitably used for a builder for a detergent, a detergent, a water treatment agent, a dispersant, a fiber treatment agent, a scale inhibitor, a cement additive, a metal ion sequestration, a thickener and various binders. The copolymer can be suitably used, in particular, for a builder for a detergent, a detergent, a water treatment agent and a dispersant.

The present invention is also directed to a builder for a detergent, a detergent, a water treatment agent or a dispersant, comprising the polyalkyleneimine alkyleneoxide copolymer of the present invention or the polyalkyleneimine alkyleneoxide copolymer produced by the production method of the present invention.

The above-mentioned builder for a detergent exerts an effect to prevent the soil from redepositing on clothes or the like under washing. When the polyalkyleneimine alkyleneoxide copolymer prevents the redeposition of the soil, it is preferred to adjust in such a way that together with an effect resulting from a steric structure of the alkyleneoxide chain, an effect of reducing an affinity with the soil in the case of having a hydrophobic end structure or a dispersing effect of the soil in the case of having a hydrophilic end structure is adequately exerted.

The builder for a detergent can be suitably used as a builder for a liquid detergent because it has high compatibility with a surfactant and a detergent to be obtained becomes a dense liquid detergent. Since it has high compatibility with a surfactant, its transparency becomes good when it is used in a liquid detergent and a problem of the occurrence of separation of the liquid detergent due to turbidity can be prevented. In addition, the high compatibility allows the liquid detergent to be dense and a washing ability of the liquid detergent to improve.

The above-mentioned builder for a detergent can be a detergent builder of extremely high quality and performance and with high stability, which has the excellent ability to prevent recontamination and further is resistant to degradation of performance in being stored for a long time or to precipitation of impurities in being maintained at low temperature.

The above-mentioned washing ability can be judged by a detergency ratio. The detergency ratio can be determined by the following procedure.

(Detergency Ratio)

An artificially contaminated cloth is used as a test piece. As an artificially contaminated cloth, clothes (STC GC C "soiled with clay", EMPA 164 "soiled with grass", EMPA 106 "soiled with carbon black and mineral oil"), which were obtained from Scientific Service Inc., are employed, and a whiteness degree has been measured in terms of reflectance in advance. A colorimeter ND-1001 DP type (manufactured by Nippon Denshoku Industries Co., Ltd.) can be used for measuring the reflectance.

Pure water is added to 1.47 g (0.74 g when EMPA 106 is used as a test piece) of calcium chloride dihydrate to prepare 10 kg of hard water.

Pure water is added to 4.8 g of sodium polyoxyethylene lauryl ether sulfate (AES), 0.6 g of polyoxyethylene lauryl ether (AE), 0.6 g of sodium borate, 0.9 g of citric acid and 2.4 g of propylene glycol to prepare 80 g of a mixture. After the mixture was adjusted to a pH of 8.2 with an aqueous solution of sodium hydroxide, pure water is added to prepare 100 g of an aqueous solution of a surfactant.

A tergotmeter is set at 27° C., and 1000 ml of the hard water, 5 ml of an aqueous solution of polymer (concentration: 0.50% (concentration is 0.60% when EMPA 106 is used as a test piece)), 10 ml of the aqueous solution of a surfactant, 5.4 g of the artificially contaminated cloth and 5.4 g of a white cloth or 10.8 g of the artificially contaminated cloth only are put in a pot, and the content is stirred at a rotational speed of 100 rpm for 10 minutes.

The artificially contaminated cloth and the white cloth are taken out of the pot and the water is wrung out from these clothes by hand. 1000 ml of the hard water is put in a pot and then the wrung artificially contaminated cloth and white cloth are put in a pot, the content is stirred at 100 rpm for 2 minutes. The artificially contaminated cloth and the white cloth are taken out of the pot, and after the water is wrung out from these clothes by hand, the artificially contaminated cloth is covered with another cloth and dried while smoothing down the creases in the artificially contaminated cloth with an iron. A whiteness degree of the dried artificially contaminated cloth is measured in terms of reflectance with a calorimeter.

Based on measurements obtained in the above-mentioned procedure, a detergency ratio (%) is determined by the following equation:

Detergency ratio (%)=(whiteness degree of artificially contaminated cloth after being washed–whiteness degree of artificially contaminated cloth before being washed)/(whiteness degree of original white cloth (*EMPA* 221) of artificially contaminated cloth–whiteness degree of artificially contaminated cloth before being washed)×100

With respect to the above-mentioned detergency ratio, a builder for a detergent, a detergent, a water treatment agent or a dispersant, comprising a composition containing a copolymer having a polyalkyleneimine-alkyleneoxide structure and having a detergency ratio of not less than 7.3% upon using EMPA 164 which is an artificially contaminated cloth or a detergency ratio of not less than 17.4% upon using EMPA 106 which is an artificially contaminated cloth also constitutes the present invention. Among such a composition containing a copolymer having a structure of polyalkyleneimine-alkyleneoxide, namely, a builder for a detergent, a detergent, a water treatment agent or a dispersant, a composition, which satisfies these two characteristics, namely, the both of the detergency ratios in the case of using EMPA 164 and in the case of using EMPA 106, is preferred. In addition, the detergency ratio in the case of using EMPA 164 is preferably not less than 7.4%. The detergency ratio in the case of using EMPA 106 is preferably not less than 17.5% and more preferably not less than 17.6%. In addition, artificially contaminated clothes EMPA 164 and EMPA 106 to be used for measuring the above-mentioned detergency ratio are standard specimens for a contamination test, which are prepared by depositing certain soil on cloth, and EMPA 164 is a specimen which is prepared by depositing the soil of grass on a white cloth of cotton (EMPA 221) and EMPA 106 is a specimen which is prepared by depositing the soil of carbon black and mineral oil on a white cloth of cotton (EMPA 221).

In the above-mentioned builder for a detergent, composition and mixing ratios of another components other than polyalkyleneimine alkyleneoxide copolymer can be appropriately used as long as not impairing the effect of the present invention, based on various components and mixing ratios thereof, which can be employed for publicly known builders for a detergent.

Though the above-mentioned detergent may be a powdery detergent or may be a liquid detergent, a liquid detergent is preferred since the polyalkyleneimine alkyleneoxide copolymer is high in the solubility in the liquid detergent. For the above-mentioned detergent, various additives, generally used in detergents, can be used in addition to the polyalkyleneimine alkyleneoxide copolymer. As the above-mentioned additives, a surfactant, an alkali builder, a chelate builder and a redeposition inhibitor for preventing the redeposition of contaminants such as sodium carboxymethyl cellulose, a soil repellent such as benzotriazole and ethylenethiourea, a soil releasing agent, a dry transfer inhibitor, a softener, alkali materials for adjusting a pH, aromatic, a solubilizing agent, a fluorescent agent, a coloring agent, a foaming agent, a foam stabilizer, a lustering agent, a fungicide, a bleaching agent, a bleaching assistant, an enzyme, a dye and a solvent and the like are suitable. Further, it is preferred to mix zeolite for a powdery detergent.

When the polyalkyleneimine alkyleneoxide copolymer is used in the above-mentioned detergent, it is preferably added in an amount 0.1 to 20% by mass relative to 100% by mass of a detergent. When the amount of the copolymer to be added is less than 0.1% by mass, the detergency of a detergent may become insufficient and when it exceeds 20% by mass, the cost efficiency may be reduced.

The form of the polyalkyleneimine alkyleneoxide copolymer mixed in the detergent may be any of liquid form or solid form and can be determined depending on a form of the detergent (for example, a detergent in liquid form or a detergent in solid form) when it is sold. This copolymer may be mixed in the detergent in the form of an aqueous solution after polymerizing, or in a state of being concentrated by reducing a water content of the aqueous solution to some extent, or in a state of being dried.

In addition, the above-mentioned detergent comprises synthetic detergents of detergents intended for home use, detergents intended for the textile industry and another industries, a hard surface cleaning agent and detergents which are used only in specific uses such as a bleaching agent in which an action of one of its components is enhanced.

The above-mentioned surfactant is at least one kind selected from an anionic surfactant, a nonionic surfactant, a cationic surfactant and an amphoteric surfactant and one kind or two or more kinds of these surfactants can be used. When two or more kinds of surfactants are used, the total amount of the anionic surfactant and the nonionic surfactant to be used is preferably not less than 50% by mass relative to 100% by mass of all surfactants. The total amount is more preferably not less than 60% by mass, still more preferably not less than 70% by mass, and particularly preferably not less than 80% by mass.

As the above-mentioned anionic surfactant, alkylbenzene sulfonate, alkyl ether sulfate, alkenyl ether sulfate, alkyl sulfate, alkenyl sulfate, α-olefinsulfonate, α-sulfofatty acid or ester salt, alkane sulfonate, saturated fatty acid salt, unsaturated fatty acid salt, alkylether carbonate, alkenyl ether carbonate, amino acid type surfactant, N-acyl amino acid type surfactant, alkyl phosphate ester or salt thereof, and alkenyl phosphate ester or salt thereof and the like are suitable.

In an alkyl group or an alkenyl group in the above-mentioned anionic surfactant, an alkyl group such as a methyl group may be branched.

As the above-mentioned nonionic surfactant, polyoxyalkylene alkyl ether, polyoxyalkylene alkenyl ether, polyoxyethylene alkylphenyl ether, higher fatty acid alkanolamide or alkyleneoxide adduct thereof, saccharose fatty acid ester, alkyl glycoxide, fatty acid glycerin monoester, and alkylamine oxide and the like are suitable. In an alkyl group or an alkenyl group in the above-mentioned nonionic surfactant, an alkyl group such as a methyl group may be branched.

As the above-mentioned cationic surfactant, quaternary ammonium salt or the like is suitable.

As the above-mentioned amphoteric surfactant, a carboxyl type amphoteric surfactant, a surfobetaine type amphoteric surfactant and the like are suitable.

In an alkyl group or an alkenyl group in the above-mentioned cationic surfactant and the above-mentioned amphoteric surfactant, an alkyl group such as a methyl group may be branched.

Generally, it is preferred that a mixing ratio of the above-mentioned surfactant is 10 to 60% by mass per 100% by mass of a liquid detergent. The mixing ratio is more preferably not less than 15% by mass and not more than 50% by mass, still more preferably not less than 20% by mass and not more than 45% by mass, and particularly preferably not less than 25% by mass and not more than 40% by mass. When the mixing ratio of the surfactant is less than 10% by mass, the detergency may not be adequately exerted and when it exceeds 60% by mass, the cost efficiency may be reduced.

Generally, it is preferred that a mixing ratio of the above-mentioned builder for a liquid detergent is 0.1 to 20% by mass per 100% by mass of a liquid detergent. The mixing ratio is more preferably in not less than 0.2% by mass and not more than 15% by mass, more preferably not less than 0.3% by mass and not more than 10% by mass, still more preferably not less than 0.4% by mass and not more than 8% by mass, and particularly preferably not less than 0.5% by mass and not more than 5% by mass. When the mixing ratio of the builder for a liquid detergent is less than 0.1% by mass, the detergent performance may not be adequately exerted and when it exceeds 20% by mass, the cost efficiency may be reduced.

Generally, it is preferred that an amount of water comprised in the above-mentioned liquid detergent is 0.1 to 75% by mass per 100% by mass of a liquid detergent. This amount is more preferably not less than 0.2% by mass and not more than 70% by mass, still more preferably not less than 0.5% by mass and not more than 65% by mass, particularly preferably not less than 0.7% by mass and not more than 60% by mass, more particularly preferably not less than 1% by mass and not more than 55% by mass, and most preferably not less than 1.5% by mass and not more than 50% by mass.

Preferably, the above-mentioned liquid detergent has kaolin turbidity of not more than 200 mg/l. More preferably, it has the kaolin turbidity of not more than 150 mg/l, still more preferably the kaolin turbidity of not more than 120 mg/l, particularly preferably not more than 100 mg/l, and most preferably not more than 50 mg/l.

Further, it is preferred that the difference between the kaolin turbidity when the polyalkyleneimine alkyleneoxide copolymer of the present invention is added to a liquid detergent and the kaolin turbidity when it is not added to a liquid detergent is not more than 500 mg/l. The difference is more preferably not more than 400 mg/l, still more preferably not more than 300 mg/l, particularly preferably not more than 200 mg/l, and most preferably not more than 100 mg/l. The kaolin turbidity can be measure, for example, by the following method.

(Method of Measuring Kaolin Turbidity)

A uniformly mixed test sample (liquid detergent) is charged into a box-shaped cell with a size of 50 mm in length×50 mm in width×10 mm in thickenss, and after bubbles are eliminated, the turbidity (kaolin turbidity: mg/l) at 25° C. is measured by using NDH 2000 (trade name: turbidity meter, manufactured by Nippon Denshoku Industries Co., Ltd.).

As an enzyme which can be blended in the detergent of the present invention, protease, lipase and cellulase and the like are suitable. Among others, protease, alkali lipase and alkali cellulase, which have high activity in an alkali cleaning solution, are preferred.

An amount of the above-mentioned enzyme to be added is preferably and not more than 5% by mass per 100% by mass of a detergent. When this amount exceeds 5% by mass, the detergency will not improve and the cost efficiency may be reduced.

As the above-mentioned alkali builder, silicate, carbonate, sulfate and the like are suitable. As the above-mentioned chelate builder, diglycolic acid, oxycarboxylate, EDTA (ethylenediaminetetraacetic acid), DTPA (diethylenetriaminepentaacetic acid), citric acid and the like are suitable. Water-soluble polycarboxylic acid polymer may be used.

The above-mentioned detergent can be a detergent of extremely high quality and performance and with high stability, which has the excellent dispersing ability and further is resistant to degradation of performance in being stored for a long time or to precipitation of impurities in being maintained at low temperature.

The above-mentioned water treatment agent will be added to water systems such as a cooling water system, a boiler water system. In this case, the polyalkyleneimine alkyleneoxide copolymer may be added as it is, or a substance containing another components in addition to the polyalkyleneimine alkyleneoxide copolymer may be added.

In the above-mentioned water treatment agent, composition and mixing ratios of the components other than polyalkyleneimine alkyleneoxide copolymer can be appropriately used as log as not impairing the effect of the present invention, based on various components and mixing ratios thereof, which can be employed for publicly known water treatment agents.

The above-mentioned dispersant may be used as long as it is an aqueous dispersant, and for example, a pigment dispersant, a cement dispersant, a dispersant of calcium carbonate and a dispersant of kaolin are suitable.

The above-mentioned dispersant can exhibit the extremely high dispersing ability, which polyalkyleneimine alkyleneoxide copolymer originally has. And it can be a dispersant of extremely high quality and performance and with high stability, which does not causes degradation of performance in being stored for a long time or precipitation of impurities in being maintained at low temperature.

In the above-mentioned dispersant, composition and mixing ratios of the components other than polyalkyleneimine alkyleneoxide copolymer can be appropriately used as long as not impairing the effect of the present invention, based on various components and mixing ratios thereof, which can be employed for publicly known dispersants.

Thus, the polyalkyleneimine alkyleneoxide copolymer of the present invention is suitable in uses of a builder for a detergent, a detergent, a water treatment agent or a dispersant, but it can also be suitably used in other uses since the various characteristics which the copolymer exerts are improved in a uses in which a polyalkyleneimine alkyleneoxide copolymer is employed.

The polyalkyleneimine alkyleneoxide copolymer of the present invention has the constitutions as described above and can exert high basic performance in point of the detergency or the like by using another hydrophilic group and/or hydrophobic group as the end structure of alkyleneoxide. Such the polyalkyleneimine alkyleneoxide copolymer can be suitably used in uses such as builders for a detergent, detergents, water treatment agents, dispersants and the like.

BEST MODE FOR CARRYING OUT THE INVENTION

Hereinafter, the present invention will be described specifically by way of examples and comparative example; however, the present invention is not limited to these examples. Herein, "%" denotes "% by mass".

Detergency ratio measuring methods in examples and comparative examples are shown below.

(Detergency Ratio (1): Hydrophilic Soil)

As an artificially contaminated cloth, clothes (test pieces prepared by cutting STC GC C "soiled with clay" in a size of 4.5 cm×7.0 cm, test pieces prepared by cutting EMPA 164 "soiled with grass" in a size of 5.0 cm×5.0 cm), which were obtained from Scientific Service Inc., were employed. A whiteness degree of the artificially contaminated cloth had been measured in terms of reflectance in advance using a calorimeter SE 2000 (manufactured by Nippon Denshoku Industries Co., Ltd.).

Pure water was added to 1.47 g of calcium chloride dihydrate to prepare 10 kg of hard water.

Pure water was added to 4.8 g of sodium polyoxyethylene lauryl ether sulfate (AES), 0.6 g of polyoxyethylene lauryl ether (AE), 0.6 g of sodium borate, 0.9 g of citric acid and 2.4 g of propylene glycol to prepare 80 g of a mixture. After the mixture was adjusted to a pH of 8.2 with an aqueous solution of sodium hydroxide, pure water was added to prepare 100 g of an aqueous solution of a surfactant.

A tergotmeter was set at 27° C., and 1000 ml of the hard water, 5 ml of an aqueous solution of polymer (concentration: 0.55%), 10 ml of the aqueous solution of the surfactant and the artificially contaminated clothes (test pieces of STC GC C: 10 sheets, test pieces of EMPA: 5 sheets) were put in a pot, and the content was stirred at a rotational speed of 100 rpm for 10 minutes.

The artificially contaminated clothes were taken out of the pot and the water was wrung out from these clothes by hand. 1000 ml of the hard water was put in a pot and then the wrung artificially contaminated clothes were put in a pot, and the content was stirred at 100 rpm for 2 minutes. The artificially contaminated clothes were taken out of the pot, and after the water was wrung out from these clothes by hand, the artificially contaminated clothes were covered with another clothes and dried while smoothing down the creases in the artificially contaminated clothes with an iron. A whiteness degree of the dried artificially contaminated clothes were measured in terms of reflectance with a calorimeter.

Based on measurements obtained in the above-mentioned procedure, a detergency ratio (%) was determined by the following equation:

Detergency ratio (%)=(whiteness degree of artificially contaminated cloth after being washed–whiteness degree of artificially contaminated cloth before being washed)/(whiteness degree of original white cloth (*EMPA* 221) of artificially contaminated cloth–whiteness degree of artificially contaminated cloth before being washed)×100

(Detergency Ratio (2): Hydrophobic Soil)

As an artificially contaminated cloth, EMPA 106 (test pieces prepared by cutting "soiled with carbon black and mineral oil" in a size of 5.0 cm×5.0 cm) was employed. As a white cloth, JIS L 0803 cotton cloth (test pieces prepared by cutting in a size of 5.0 cm×5.0 cm) was employed. A whiteness degree of the artificially contaminated cloth had been measured in terms of reflectance in advance using a colorimeter SE 2000 (manufactured by Nippon Denshoku Industries Co., Ltd.).

Pure water was added to 0.74 g of calcium chloride dihydrate to prepare 10 kg of hard water.

Pure water was added to 4.8 g of sodium polyoxyethylene lauryl ether sulfate (AES), 0.6 g of polyoxyethylene lauryl ether (AE), 0.6 g of sodium borate, 0.9 g of citric acid and 2.4 g of propylene glycol to prepare 80 g of a mixture. After the mixture was adjusted to a pH of 8.2 with an aqueous solution of sodium hydroxide, pure water was added to prepare 100 g of an aqueous solution of a surfactant.

A tergotmeter was set at 27° C., and 1000 ml of the hard water, 5 ml of an aqueous solution of polymer (concentration: 0.60%), 10 ml of the aqueous solution of the surfactant, and 7 sheets of the artificially contaminated clothes and 7 sheets of the white clothes were put in a pot, and the content was stirred at a rotational speed of 100 rpm for 10 minutes.

The artificially contaminated clothes and the white clothes were taken out of the pot and the water was wrung out from these clothes by hand. 1000 ml of the hard water was put in a pot and then the wrung artificially contaminated clothes and white clothes were put in a pot, and the content was stirred at 100 rpm for 2 minutes. The artificially contaminated clothes and the white clothes were taken out of the pot, and after the water was wrung out from these clothes by hand, the artificially contaminated clothes were covered with another clothes and dried while smoothing down the creases in the artificially contaminated clothes with an iron. A whiteness degree of the dried artificially contaminated clothes were measured in terms of reflectance with a calorimeter.

Based on measurements obtained in the above-mentioned procedure, a detergency ratio (%) was determined by the following equation:

Detergency ratio (%)=(whiteness degree of artificially contaminated cloth after being washed–whiteness degree of artificially contaminated cloth before being washed)/(whiteness degree of original white cloth (*EMPA* 221) of artificially contaminated cloth–whiteness degree of artificially contaminated cloth before being washed)×100

Polymer (1)

As a polymer (1), there was used a polyethyleneimine-ethyleneoxide copolymer obtained by ethoxylating polyethyleneimine (PEI) (average molecular weight: 600, made by Nippon Shokubai Co., Ltd.) with ethyleneoxide in a ratio of 20 moles per 1 mole of nitrogen atom of polyethyleneimine.

EXAMPLE 1

Into a glass reactor equipped with a thermometer and a stirrer, 25 g of the polymer (1) was charged, and to this, 2.5 g of powder maleic anhydride was added under stirring. This polymer mixture was heated to a temperature of 60° C. under stirring and was reacted for 6 hours to obtain a water-soluble polymer (1). The formation of the water-soluble polymer (1) was verified in a manner described below.

By adding a proper amount of water to the obtained water-soluble polymer (1), about 50 g of an aqueous solution of the polymer with a concentration of 30% by mass was prepared, and 20 g of the aqueous solution was put in a dialysis membrane of 40 cm in length and the membrane was sealed. As a dialysis membrane, Spectra/Por Membrane MWCO: 1000, fractionated molecular weight: 1000, (made by SPECTRUM LABORATORIES INC.) was used (in the present invention, any dialysis membrane having fractionated molecular weight similar to that of the above-mentioned dialysis membrane can be used). This sealed membrane was immersed in 2000 g of water in a 2 liter beaker and stirred with a stirrer. After 3 hours, the dialysis membrane was taken out of the beaker and the outside of the dialysis membrane was washed off well with water, and then the content of the dialysis membrane was taken out. After the content taken out was concentrated with an evaporator, it was left alone and dried for 12 hours in a desiccator in which a pressure was reduced.

For comparison, 20 g of the aqueous solution of the polymer with a concentration of 30% by mass before being dialyzed was concentrated with an evaporator and then was left alone and dried for 12 hours in a desiccator in which a pressure was reduced.

Since it is thought that a change in weight of the dried sample weighed before and after dialysis was brought about by unreacted maleic anhydride, the yield of a reaction product was calculated from the values of the weight changed. As a result, the yield was 86%.

In addition, the dried sample after dialysis was dissolved in $D_2O$ and $^1H$-NMR spectrum was analyzed, signals, which are derived from the double bond of half esterified maleic acid, were detected in the vicinity of 5.90 ppm and 6.48 ppm.

From these results, it was verified that the water-soluble polymer (1) was a copolymer which the polyalkyleneimine-ethyleneoxide copolymer was esterified by maleic acid.

The detergency of the water-soluble polymer (1) was measured. The results of measurement are shown in Table 1.

EXAMPLE 2

Into a glass reactor equipped with a thermometer and a stirrer, 25 g of the polymer (1) was charged, and to this, 2.5 g of powder succinic anhydride was added under stirring. This polymer mixture was heated to a temperature of 60° C. under stirring and was reacted for 24 hours to obtain a water-soluble polymer (2). The formation of the water-soluble polymer (2) was verified in a manner described below.

By adding a proper amount of water to the obtained water-soluble polymer (2), about 50 g of an aqueous solution of the polymer with a concentration of 30% by mass was prepared, and 20 g of the aqueous solution was put in a dialysis membrane of 40 cm in length and the membrane was sealed. As a dialysis membrane, Spectra/Por Membrane MWCO: 1000, fractionated molecular weight: 1000, (made by SPECTRUM LABORATORIES INC.) was used (in the present invention, any dialysis membrane having fractionated molecular weight similar to that of the above-mentioned dialysis membrane can be used). This sealed membrane was immersed in 2000 g of water in a 2 liter beaker and stirred with a stirrer. After 3 hours, the dialysis membrane was taken out of the beaker and the outside of the dialysis membrane was washed off well with water, and then the content of the dialysis membrane was taken out. After the content taken out was concentrated with an evaporator, it was left alone and dried for 12 hours in a desiccator in which a pressure was reduced.

For comparison, 20 g of the aqueous solution of the polymer with a concentration of 30% by mass before being dialyzed was concentrated with an evaporator and then was left alone and dried for 12 hours in a desiccator in which a pressure was reduced.

Since it is thought that a change in weight of the charged polymer after dialysis was brought about by unreacted succinic anhydride, the yield of a reaction product was calculated from the values of the weight changed. As a result, the yield was 81%.

In addition, the dried sample after dialysis was dissolved in $D_2O$ and $^1$H-NMR spectrum was analyzed, signals, which are derived from ethylene of half esterified succinic acid, were detected in the vicinity of 2.42 ppm and 2.48 ppm.

From these results, it was verified that the water-soluble polymer (2) was a copolymer which the polyalkyleneimine-ethyleneoxide copolymer was esterified by succinic acid.

The detergency of the water-soluble polymer (2) was measured. The results of measurement are shown in Table 1.

EXAMPLE 3

Into a glass reactor equipped with a thermometer and a stirrer, 25 g of the polymer (1) was charged, and to this, 2.5 g of powder phthalic acid anhydride was added under stirring. This polymer mixture was heated to a temperature of 60° C. under stirring and was reacted for 24 hours to obtain a water-soluble polymer (3). The formation of the water-soluble polymer (3) was verified in a manner described below.

By adding a proper amount of water to the obtained water-soluble polymer (3), about 50 g of an aqueous solution of the polymer with a concentration of 30% by mass was prepared, and 20 g of the aqueous solution was put in a dialysis membrane of 40 cm in length and the membrane was sealed. As a dialysis membrane, Spectra/Por Membrane MWCO: 1000, fractionated molecular weight: 1000, (made by SPECTRUM LABORATORIES INC.) was used (in the present invention, any dialysis membrane having fractionated molecular weight similar to that of the above-mentioned dialysis membrane can be used). This sealed membrane was immersed in 2000 g of water in a 2 liter beaker and stirred with a stirrer. After 3 hours, the dialysis membrane was taken out of the beaker and the outside of the dialysis membrane was washed off well with water, and then the content of the dialysis membrane was taken out. After the content taken out was concentrated with an evaporator, it was left alone and dried for 12 hours in a desiccator in which a pressure was reduced.

For comparison, 20 g of the aqueous solution of the polymer with a concentration of 30% by mass before being dialyzed was concentrated with an evaporator and then was left alone and dried for 12 hours in a desiccator in which a pressure was reduced.

Since it is thought that a change in weight of the charged polymer after dialysis was brought about by unreacted phthalic anhydride, the yield of a reaction product was calculated from the values of the weight changed. As a result, the yield was 84%.

In addition, the dried sample after dialysis was dissolved in $D_2O$ and $^1$H-NMR spectrum was analyzed, signals, which are derived from the aromatic ring of half esterified phthalic acid, were detected in the vicinity of 7.38 ppm, 7.45 ppm and 7.68 ppm.

From these results, it was verified that the water-soluble polymer (3) was a copolymer which the polyalkyleneimine-ethyleneoxide copolymer was esterified by phthalic acid.

The detergency of the water-soluble polymer (3) was measured. The results of measurement are shown in Table 1.

EXAMPLE 4

Into a glass reactor equipped with a thermometer and a stirrer, 25 g of the polymer (1) was charged, and to this, 2.5 g of allyl glycidyl ether was added under stirring. This polymer mixture was heated to a temperature of 60° C. under stirring and was reacted for 24 hours to obtain a water-soluble polymer (4). The formation of the water-soluble polymer (4) was verified in a manner described below.

By adding a proper amount of water to the obtained water-soluble polymer (4), about 50 g of an aqueous solution of the polymer with a concentration of 30% by mass was prepared, and 20 g of the aqueous solution was put in a dialysis membrane of 40 cm in length and the membrane was sealed. As a dialysis membrane, Spectra/Por Membrane MWCO: 1000, fractionated molecular weight: 1000, (made by SPECTRUM LABORATORIES INC.) was used (in the present invention, any dialysis membrane having fractionated molecular weight similar to that of the above-mentioned dialysis membrane can be used). This sealed membrane was immersed in 2000 g of water in a 2 liter beaker and stirred with a stirrer. After 3 hours, the dialysis membrane was taken out of the beaker and the outside of the dialysis membrane was washed off well with water, and then the content of the dialysis membrane was taken out. After the content taken out was concentrated with an evaporator, it was left alone and dried for 12 hours in a desiccator in which a pressure was reduced.

For comparison, 20 g of the aqueous solution of the polymer with a concentration of 30% by mass before being dialyzed was concentrated with an evaporator and then was left alone and dried for 12 hours in a desiccator in which a pressure was reduced.

Since it is thought that a change in weight of the charged polymer after dialysis was brought about by unreacted allyl glycidyl ether, the yield of a reaction product was calculated from the values of the weight changed. As a result, the yield was 90%.

In addition, the dried sample after dialysis was dissolved in $D_2O$ and $^1$H-NMR spectrum was analyzed, signals, which are derived from the double bond of allyl glycidyl ether which added to the polymer by epoxy ring, were detected in the vicinity of 5.20 ppm and 5.80 ppm.

From these results, it was verified that the water-soluble polymer (4) was a copolymer which the polyalkyleneimine-ethyleneoxide copolymer was added by epoxy ring of allyl glycidyl ether.

The detergency of the water-soluble polymer (4) was measured. The results of measurement are shown in Table 1.

EXAMPLE 5

Into a glass reactor equipped with a thermometer and a stirrer, 25 g of the polymer (1) was charged, and to this, 1.25 g of allyl glycidyl ether was added under stirring. This polymer mixture was heated to a temperature of 60° C. under stirring and was reacted for 24 hours to obtain a water-soluble polymer (5). The formation of the water-soluble polymer (5) was verified in a manner described below.

By adding a proper amount of water to the obtained water-soluble polymer (5), about 50 g of an aqueous solution of the polymer with a concentration of 30% by mass was prepared, and 20 g of the aqueous solution was put in a dialysis membrane of 40 cm in length and the membrane was sealed. As a dialysis membrane, Spectra/Por Membrane MWCO: 1000, fractionated molecular weight: 1000, (made by SPECTRUM LABORATORIES INC.) was used (in the present invention, any dialysis membrane having fractionated molecular weight similar to that of the above-mentioned dialysis membrane can be used). This sealed membrane was immersed in 2000 g of water in a 2 liter beaker and stirred with a stirrer. After 3 hours, the dialysis membrane was taken out of the beaker and the outside of the dialysis membrane was washed off well with water, and then the content of the dialysis membrane was taken out. After the content taken out was concentrated with an evaporator, it was left alone and dried for 12 hours in a desiccator in which a pressure was reduced.

For comparison, 20 g of the aqueous solution of the polymer with a concentration of 30% by mass before being dialyzed was concentrated with an evaporator and then was left alone and dried for 12 hours in a desiccator in which a pressure was reduced.

Since it is thought that a change in weight of the charged polymer after dialysis was brought about by unreacted allyl gylcidyl ether, the yield of a reaction product was calculated from the values of the weight changed. As a result, the yield was 96%.

In addition, the dried sample after dialysis was dissolved in $D_2O$ and $^1$H-NMR spectrum was analyzed, signals, which are derived from the double bond of allyl glycidyl ether which added to the polymer by epoxy ring, were detected in the vicinity of 5.20 ppm and 5.80 ppm.

From these results, it was verified that the water-soluble polymer (5) was a copolymer which the polyalkyleneimine-ethyleneoxide copolymer was added by epoxy ring of allyl glycidyl ether.

EXAMPLE 6

Into a glass reactor equipped with a thermometer and a stirrer, 25 g of the polymer (1) was charged, and to this, 2.5 g of phenyl glycidyl ether was added under stirring. This polymer mixture was heated to a temperature of 60° C. under stirring and was reacted for 24 hours to obtain a water-soluble polymer (6). The formation of the water-soluble polymer (6) was verified in a manner described below.

By adding a proper amount of water to the obtained water-soluble polymer (6), about 50 g of an aqueous solution of the polymer with a concentration of 30% by mass was prepared, and 20 g of the aqueous solution was put in a dialysis membrane of 40 cm in length and the membrane was sealed. As a dialysis membrane, Spectra/Por Membrane MWCO: 1000, fractionated molecular weight: 1000, (made by SPECTRUM LABORATORIES INC.) was used (in the present invention, any dialysis membrane having fractionated molecular weight similar to that of the above-mentioned dialysis membrane can be used). This sealed membrane was immersed in 2000 g of water in a 2 liter beaker and stirred with a stirrer. After 3 hours, the dialysis membrane was taken out of the beaker and the outside of the dialysis membrane was washed off well with water, and then the content of the dialysis membrane was taken out. After the content taken out was concentrated with an evaporator, it was left alone and dried for 12 hours in a desiccator in which a pressure was reduced.

For comparison, 20 g of the aqueous solution of the polymer with a concentration of 30% by mass before being dialyzed was concentrated with an evaporator and then was left alone and dried for 12 hours in a desiccator in which a pressure was reduced.

Since it is thought that a change in weight of the charged polymer after dialysis was brought about by unreacted phenyl glycidyl ether, the yield of a reaction product was calculated from the values of the weight changed. As a result, the yield was 93%.

In addition, the dried sample after dialysis was dissolved in $D_2O$ and $^1$H-NMR spectrum was analyzed, signals, which are derived from the aromatic ring of phenyl glycidyl ether which added to the polymer by epoxy ring, were detected in the vicinity of 6.88 ppm and 7.22 ppm.

From these results, it was verified that the water-soluble polymer (6) was a copolymer which the polyalkyleneimine-ethyleneoxide copolymer was added by epoxy ring of phenyl glycidyl ether.

The detergency of the water-soluble polymer (6) was measured. The results of measurement are shown in Table 1 and Table 2.

EXAMPLE 7

Into a glass reactor equipped with a thermometer and a stirrer, 25 g of the polymer (1) was charged, and to this, 1.25 g of phenyl glycidyl ether was added under stirring. This polymer mixture was heated to a temperature of 60° C. under stirring and was reacted for 24 hours to obtain a water-soluble polymer (7). The formation of the water-soluble polymer (7) was verified in a manner described below.

By adding a proper amount of water to the obtained water-soluble polymer (7), an aqueous solution of the polymer with a concentration of 30% by mass was prepared, and 20 g of the aqueous solution was put in a dialysis membrane of 40 cm in length and the membrane was sealed. As a dialysis membrane, Spectra/Por Membrane MWCO: 1000, fractionated molecular weight: 1000, (made by SPECTRUM LABORATORIES INC.) was used (in the present invention, any dialysis membrane having fractionated molecular weight similar to that of the above-mentioned dialysis membrane can be used). This sealed membrane was immersed in 2000 g of water in a 2 liter beaker and stirred with a stirrer. After 3 hours, the dialysis membrane was taken out of the beaker and the outside of the dialysis membrane was washed off well with water, and then the content of the dialysis membrane was taken out. After the content taken out was concentrated with an evaporator, it was left alone and completely dried for 12 hours in a desiccator in which a pressure was reduced.

For comparison, 20 g of the aqueous solution of the polymer with a concentration of 30% by mass before being dialyzed was concentrated with an evaporator and then was left alone and dried for 12 hours in a desiccator in which a pressure was reduced.

Since it is thought that a change in weight of the charged polymer after dialysis was brought about by unreacted phenyl glycidyl ether, the yield of a reaction product was calculated from the values of the weight changed. As a result, the yield was 97%.

In addition, the dried sample after dialysis was dissolved in $D_2O$ and $^1$H-NMR spectrum was analyzed, signals, which are derived from aromatic ring of phenyl glycidyl ether which added to the polymer by epoxy ring, were detected in the vicinity of 6.88 ppm and 7.22 ppm.

From these results, it was verified that the water-soluble polymer (7) was a copolymer which the polyalkyleneimine-ethyleneoxide copolymer was added by epoxy ring of phenyl glycidyl ether.

The detergency of the water-soluble polymer (7) was measured. The results of measurement are shown in Table 2.

EXAMPLE 8

Into a glass reactor equipped with a thermometer and a stirrer, 22 g of the water-soluble polymer (4) which was synthesized in Example 4 and 35.7 g of pure water was charged, and to this, 1.8 g of sodium hydrogen sulfite was added under stirring. This polymer mixture was reacted at room temperature for 5 hours under stirring without sealing of the reactor to obtain a water-soluble polymer (8). The formation of the water-soluble polymer (8) was verified in a manner described below.

By adding a proper amount of water to the obtained water-soluble polymer (8), an aqueous solution of the polymer with a concentration of 30% by mass was prepared, and 20 g of the aqueous solution was put in a dialysis membrane of 40 cm in length and the membrane was sealed. As a dialysis membrane, Spectra/Por Membrane MWCO: 1000, fractionated molecular weight: 1000, (made by SPECTRUM LABORATORIES INC.) was used (in the present invention, any dialysis membrane having fractionated molecular weight similar to that of the above-mentioned dialysis membrane can be used). This sealed membrane was immersed in 2000 g of water in a 2 liter beaker and stirred with a stirrer. After 3 hours, the dialysis membrane was taken out of the beaker and the outside of the dialysis membrane was washed off well with water, and then the content of the dialysis membrane was taken out. After the content taken out was concentrated with an evaporator, it was left alone and completely dried for 12 hours in a desiccator in which a pressure was reduced.

For comparison, 20 g of the aqueous solution of the polymer with a concentration of 30% by mass before being dialyzed was concentrated with an evaporator and then was left alone and dried for 12 hours in a desiccator in which a pressure was reduced.

Since it is thought that a change in weight of the charged polymer after dialysis was brought about by total weight of unreacted sodium hydrogen sulfite and allyl glycidyl ether or total weight of low molecular compound derived from these substances, the yield of a reaction product was calculated from the values of the weight changed. As a result, the yield was 90%.

In addition, the dried sample after dialysis was dissolved in $D_2O$ and $^1H$-NMR spectrum was analyzed, signals, which are derived from the structure made by sulfonation of the double bond of allyl glycidyl ether which was added to the polymer by epoxy ring, were detected in the vicinity of 1.85 ppm and 2.78 ppm.

Furtheremore, sulfur of the samples before and after the dialysis were compared with Inductively Coupled Plasma (ICP) emission spectral analysis. And it was found that 90% of the sulfur was contained in the sample after the dialysis.

From these results, it was verified that the water-soluble polymer (8) was a copolymer which the polyalkyleneimine-ethyleneoxide copolymer was added by epoxy ring of ally glycidyl ether and the double bond of ally glycidyl ether was added by the sulfonic acid group.

The detergency of the water-soluble polymer (8) was measured. The results of measurement are shown in Table 2.

EXAMPLE 9

Into a glass reactor equipped with a thermometer and a stirrer, 21 g of the water-soluble polymer (5) which was synthesized in Example 5 and 32.8 g of pure water was charged, and to this, 1.8 g of sodium hydrogen sulfite was added under stirring. This polymer mixture was reacted at room temperature for 5 hours under stirring without sealing of the reactor to obtain a water-soluble polymer (9). The formation of the water-soluble polymer (9) was verified in a manner described below.

By adding a proper amount of water to the obtained water-soluble polymer (9), an aqueous solution of the polymer with a concentration of 30% by mass was prepared, and 20 g of the aqueous solution was put in a dialysis membrane of 40 cm in length and the membrane was sealed. As a dialysis membrane, Spectra/Por Membrane MWCO: 1000, fractionated molecular weight: 1000, (made by SPECTRUM LABORATORIES INC.) was used (in the present invention, any dialysis membrane having fractionated molecular weight similar to that of the above-mentioned dialysis membrane can be used). This sealed membrane was immersed in 2000 g of water in a 2 liter beaker and stirred with a stirrer. After 3 hours, the dialysis membrane was taken out of the beaker and the outside of the dialysis membrane was washed off well with water, and then the content of the dialysis membrane was taken out. After the content taken out was concentrated with an evaporator, it was left alone and completely dried for 12 hours in a desiccator in which a pressure was reduced.

For comparison, 20 g of the aqueous solution of the polymer with a concentration of 30% by mass before being dialyzed was concentrated with an evaporator and then was left alone and dried for 12 hours in a desiccator in which a pressure was reduced.

Since it is thought that a change in weight of the charged polymer after dialysis was brought about by total weight of unreacted sodium hydrogen sulfite and allyl glycidyl ether or total weight of low molecular compound derived from these substances, the yield of a reaction product was calculated from the values of the weight changed. As a result, the yield was 93%.

In addition, the dried sample after dialysis was dissolved in $D_2O$ and $^1H$-NMR spectrum was analyzed, signals, which are derived from the structure made by sulfonation of the double bond of allyl glycidyl ether which was added to the polymer by epoxy ring, were detected in the vicinity of 1.85 ppm and 2.78 ppm.

Furthermore, sulfur of the samples before and after the dialysis were compared with Inductively Coupled Plasma (ICP) emission spectral analysis. And it was found that 90% of the sulfur was contained in the sample after the dialysis.

From these results, it was verified that the water-soluble polymer (9) was a copolymer which the polyalkyleneimine-ethyleneoxide copolymer was added by epoxy ring of ally glycidyl ether and the double bond of ally glycidyl ether was added by the sulfonic acid group.

EXAMPLE 10

Into a glass reactor equipped with a thermometer and a stirrer, 22 g of the water-soluble polymer (1) which was synthesized in Example 1 and 36.9 g of pure water was charged, and to this, 2.6 g of sodium sulfite was added under stirring. This polymer mixture was reacted at room temperature for 1 hour under stirring to obtain a water-soluble polymer (10). The formation of the water-soluble polymer (10) was verified in a manner described below.

By adding a proper amount of water to the obtained water-soluble polymer (10), an aqueous solution of the polymer with a concentration of 30% by mass was prepared, and 20 g of the aqueous solution was put in a dialysis membrane of 40 cm in length and the membrane was sealed. As a dialysis membrane, Spectra/Por Membrane MWCO: 1000, fractionated molecular weight: 1000, (made by SPECTRUM LABORATORIES INC.) was used (in the present invention, any dialysis membrane having fractionated molecular weight similar to that of the above-mentioned dialysis membrane can be used). This sealed membrane was immersed in 2000 g of water in a 2 liter beaker and stirred with a stirrer. After 3 hours, the dialysis membrane was taken out of the beaker and the outside of the dialysis membrane was washed off well with water, and then the content of the dialysis membrane was taken out. After the content taken out was concentrated with an evaporator, it was left alone and completely dried for 12 hours in a desiccator in which a pressure was reduced.

For comparison, 20 g of the aqueous solution of the polymer with a concentration of 30% by mass before being dialyzed was concentrated with an evaporator and then was left alone and dried for 12 hours in a desiccator in which a pressure was reduced.

Since it is thought that a change in weight of the charged polymer after dialysis was brought about by total weight of unreacted sodium sulfite and maleic acid or total weight of low molecular compound derived from these substances, the yield of a reaction product was calculated from the values of the weight changed. As a result, the yield was 89%.

In addition, the dried sample after dialysis was dissolved in $D_2O$ and $^1$H-NMR spectrum was analyzed, signals, which are derived from the structure made by sulfonation of the double bond of half esterified maleic acid, were detected in the vicinity of 2.88 ppm, 3.85 ppm and 4.15 ppm.

Furthermore, sulfur of the samples before and after the dialysis were compared with Inductively Coupled Plasma (ICP) emission spectral analysis. And it was found that 90% of the sulfur was contained in the sample after the dialysis.

From these results, it was verified that the water-soluble polymer (10) was a copolymer which the polyalkylene-imine-ethyleneoxide copolymer was esterified by maleic acid and the double bond of maleic acid was added by the sulfonic acid group.

The detergency of the water-soluble polymer (10) was measured. The results of measurement are shown in Table 2.

EXAMPLE 11

Into a glass reactor equipped with a thermometer and a stirrer, 25 g of the polymer (1) was charged, and to this, 2.5 g of powder cis-Δ4-tetrahidrophthalic anhydride was added under stirring. This polymer mixture was heated to a temperature of 80° C. under stirring and was reacted for 3 hours to obtain a water-soluble polymer (11). The formation of the water-soluble polymer (11) was verified in a manner described below.

By adding a proper amount of water to the obtained water-soluble polymer (11), about 50 g of an aqueous solution of the polymer with a concentration of 30% by mass was prepared, and 20 g of the aqueous solution was put in a dialysis membrane of 40 cm in length and the membrane was sealed. As a dialysis membrane, Spectra/Por Membrane MWCO: 1000, fractionated molecular weight: 1000, (made by SPECTRUM LABORATORIES INC.) was used (in the present invention, any dialysis membrane having fractionated molecular weight similar to that of the above-mentioned dialysis membrane can be used). This sealed membrane was immersed in 2000 g of water in a 2 liter beaker and stirred with a stirrer. After 3 hours, the dialysis membrane was taken out of the beaker and the outside of the dialysis membrane was washed off well with water, and then the content of the dialysis membrane was taken out. After the content taken out was concentrated with an evaporator, it was left alone and dried for 12 hours in a desiccator in which a pressure was reduced.

For comparison, 20 g of the aqueous solution of the polymer with a concentration of 30% by mass before being dialyzed was concentrated with an evaporator and then was left alone and dried for 12 hours in a desiccator in which a pressure was reduced.

Since it is thought that a change in weight of the dried sample weighed before and after dialysis was brought about by unreacted cis-Δ4-tetrahidrophthalic anhydride, the yield of a reaction product was calculated from the values of the weight changed. As a result, the yield was 96%.

In addition, the dried sample after dialysis was dissolved in $D_2O$ and $^1$H-NMR spectrum was analyzed, signals, which are derived from the double bond of half esterified cis-Δ4-tetrahidrophthalic anhydride, were detected in the vicinity of 2.26 ppm, 2.90 ppm and 5.58 ppm.

From these results, it was verified that the water-soluble polymer (11) was a copolymer which the polyalkylene-imine-ethyleneoxide copolymer was esterified by cis-Δ4-tetrahidrophthalic acid.

EXAMPLE 12

Into a glass reactor equipped with a thermometer and a stirrer, 22 g of the water-soluble polymer (11) and 35.1 g of pure water was charged, and to this, 1.4 g of sodium hydrogen sulfite was added under stirring. This polymer mixture was reacted at room temperature for 8 hours under stirring without sealing of the reactor to obtain a water-soluble polymer (12). The formation of the water-soluble polymer (12) was verified in a manner described below.

By adding a proper amount of water to the obtained water-soluble polymer (12), an aqueous solution of the polymer with a concentration of 30% by mass was prepared, and 20 g of the aqueous solution was put in a dialysis membrane of 40 cm in length and the membrane was sealed. As a dialysis membrane, Spectra/Por Membrane MWCO: 1000, fractionated molecular weight: 1000, (made by SPECTRUM LABORATORIES INC.) was used (in the present invention, any dialysis membrane having fractionated molecular weight similar to that of the above-mentioned dialysis membrane can be used). This sealed membrane was immersed in 2000 g of water in a 2 liter beaker and stirred with a stirrer. After 3 hours, the dialysis membrane was taken out of the beaker and the outside of the dialysis membrane was washed off well with water, and then the content of the dialysis membrane was taken out. After the content taken out was concentrated with an evaporator, it was left alone and completely dried for 12 hours in a desiccator in which a pressure was reduced.

For comparison, 20 g of the aqueous solution of the polymer with a concentration of 30% by mass before being dialyzed was concentrated with an evaporator and then was left alone and dried for 12 hours in a desiccator in which a pressure was reduced.

Since it is thought that a change in weight of the charged polymer after dialysis was brought about by total weight of unreacted sodium hydrogen sulfite and cis-Δ4-tetrahidrophthalic acid or total weight of low molecular compound derived from these substances, the yield of a reaction product was calculated from the values of the weight changed. As a result, the yield was 92%.

In addition, the dried sample after dialysis was dissolved in D$_2$O and $^1$H-NMR spectrum was analyzed, signals, which are derived from the structure made by sulfonation of the double bond of half esterified cis-Δ4-tetrahidrophthalic acid, were detected in the vicinity of 1.35 ppm, 1.68 ppm and 3.20 ppm.

Furthermore, sulfur of the samples before and after the dialysis were compared with Inductively Coupled Plasma (ICP) emission spectral analysis. And it was found that 90% of the sulfur was contained in the sample after the dialysis.

From these results, it was verified that the water-soluble polymer (12) was a copolymer which the polyalkyleneimine-ethyleneoxide copolymer was esterified by cis-Δ4-tetrahidrophthalic acid and the double bond of cis-Δ4-tetrahidrophthalic acid was added by the sulfonic acid group.

The detergency of the water-soluble polymer (12) was measured. The results of measurement are shown in Table 2.

TABLE 1

| | | Example 1 | Example 2 | Example 3 | Example 6 | Polymer 1 | Blank |
|---|---|---|---|---|---|---|---|
| Detergency ratio (%) | STC GCC | 24.3 | 24.2 | 24.9 | 24.2 | 24.2 | 22.1 |
| | EMPA164 | 8.0 | 7.4 | 8.1 | 8.0 | 7.2 | 7.2 |

TABLE 2

| | | Example 4 | Example 6 | Example 7 | Example 8 | Example 10 | Example 12 | Polymer 1 | Blank |
|---|---|---|---|---|---|---|---|---|---|
| Detergency ratio (%) | EMPA106 | 19.3 | 17.7 | 18.0 | 18.7 | 18.8 | 18.5 | 17.3 | 16.8 |

Table 1 shows the result of measurement of Detergency ratio (1): hydrophilic soil. And Table 2 shows the result of measurement of Detergency ratio (2): hydrophobic soil. "Polymer 1" in Table 1 and 2 shows the result of measurement of detergency ratio using the polymer (1). "Blank" shows the result of measurement when hard water is used instead of the aqueous solution of polymer.

From the above results, it was found that the detergency ratio of polyethyleneimine-ethyleneoxide copolymer of examples 1, 2, 3, 4, 6, 7, 8, 10 and 12 were improved compared with the polymer (1), of which the end structure was not modified.

The present application claims priority under 35 U.S.C. §119 to Japanese Patent Application No.2003-331973, filed Sep. 24, 2003, entitled "POLYALKYLENEIMINE ALKYLENEOXIDE COPOLYMER" and Japanese Patent Application No.2004-140385, filed May 10, 2004, entitled "POLYALKYLENEIMINE ALKYLENEOXIDE COPOLYMER". The contents of those applications are incorporated herein by reference in their entirety.

The invention claimed is:

1. A polyalkyleneimine alkyleneoxide copolymer having a structure in which an oxyalkylene group is added to a nitrogen atom of a polyalkyleneimine unit composed of alkyleneimine,
   wherein the polyalkyleneoxide has an end structure containing at least one selected from the group consisting of:
   (1) —CO—R$^2$—COOX;
   (2) —CH$_2$CH(OH)—R$^3$;
   (3) —CH$_2$CH(OH)CH$_2$—O—R$^4$; and
   (4) —C(O)—NH—R$^5$, wherein R$^2$ represents an alkylene group having 2 to 8 carbon atoms, an alkenylene group having 2 to 8 carbon atoms, an arylene group having 6 to 14 carbon atoms or a sulfoalkylene group having 2 to 8 carbon atoms; R$^3$ represents an alkenyl group having 2 to 6 carbon atoms, an aryl group having 6 to 14 carbon atoms, a sulfoalkyl group having 2 to 6 carbon atoms or a hydroxyalkyl group having 2 to 6 carbon atoms; R$^4$ represents a hydrogen atom, an alkyl group having 2 to 8 carbon atoms, an alkenyl group having 2 to 6 carbon atoms, an aryl group having 6 to 14 carbon atoms or a sulfoalkyl group having 2 to 6 carbon atoms; R$^5$ represents an alkyl group having 2 to 8 carbon atoms, an alkenyl group having 2 to 8 carbon atoms, an aryl group having 6 to 14 carbon atoms or a sulfoalkyl group having 2 to 6 carbon atoms; and X represents a hydrogen atom, an alkaline metal atom, an alkaline earth metal atom, an ammonium group or an organic ammonium group,
   wherein a content of the end structure selected from the group consisting of the groups (1) to (4) is not less than 5 mol % and not more than 100 mol % with respect to 100 mol % of all end structures of polyalkyleneoxide,
   wherein the polyalkyleneimine alkyleneoxide copolymer is a copolymer obtained by adding alkyleneoxide to a nitrogen atom in amine of polyamine having a structure represented by the following general formula (2);

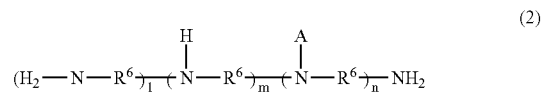

(2)

wherein R$^6$ s are the same or different and each represents a straight alkylene group having 2 to 6 carbon atoms or branched alkylene group having 3 to 6 carbon atoms; A represents another polyamine chain branched, and 1, m and n are the same or different and each represents an integer of 0 or 1 or more and the m-to-n ratio (m/n ratio) is from 4/1 to 1/4,
   wherein a content of the end structure selected from the group consisting of the groups (1) to (4) is not less than 20 mol % and not more than 98 mol % with respect to 100 mol % of all end structures of polyalkyleneoxide.

2. A production method of polyalkyleneimine alkyleneoxide copolymer, which comprises reacting polyalkyleneimine alkyleneoxide copolymer through at least one step selected from the group consisting of:

(1) a step of reacting with a cyclic anhydride in a molecule of polycarboxylic acid;
(2) a step of reacting with aryl epoxyethane or epoxy alkylene having 2 to 6 carbon atoms;
(3) a step of reacting with glycidol, alkyl glycidyl ether, alkenyl glycidyl ether or aryl glycidyl ether;
(4) a step of reacting with alkyl isocyanate, alkenyl isocyanate or aryl isocyanate;
(5) a step of reacting with hydrogensulfite salt and/or sulfite salt after the step (1); and
(6) a step of reacting with hydrogensulfite salt and/or sulfite salt in the presence of a radical source or oxygen after the step (2), (3) or (4), wherein the cyclic anhydride in a molecule of polycarboxylic acid is at least one species selected from the group consisting of succinic anhydride, maleic anhydride, phthalic anhydride, trimellitic anhydride, cis-Δ4-tetrahydrophthalic anhydride, itaconic anhydride, and in steps (1) to (6), the molar ratio of polyalkyleneimine-alkyleneoxide used for a reaction to a raw material to be reacted with the polyalkyleneimine-alkyleneoxide (polyalkyleneimine-allcyleneoxide/a raw material to be reacted with the polyalkyleneimine-alkyleneoxide) is in a range of 50/1 to 1/50, wherein the raw material stands for cyclic anhydride in a molecule of polycarboxylic acid, aryl epoxyethane or epoxy alkylene having 2 to 6 carbon atoms, glycidol, alkyl glycidyl ether, alkenyl glycidyl ether or aryl glycidyl ether, alkyl isocyanate, alkenyl isocyanate, aryl isocyanate, hydrogensulfite salt or sulfite salt in the steps (1) to (6), wherein the polyalkyleneimine alkyleneoxide copolymer is a copolymer obtained by adding alkyleneoxide to a nitrogen atom in amine of polyamine having a structure represented by the following general formula (2):

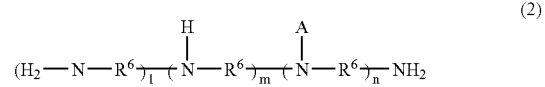

wherein $R^6$s are the same or different and each represents a straight alkylene group having 2 to 6 carbon atoms or a branched alkylene group having 3 to 6 carbon atoms; A represents another polyamine chain branched, and l, m and n are the same or different and each represents an integer of 0 or 1 or more and the m-to-n ratio (m/n ratio) is from 4/1 to 1/4;

wherein a content of the end structure selected from the group consisting of the groups (1) to (4) is not less than 20 mol % and not more than 98 mol % with respect to 100 mol % of all end structures of polyalkyleneoxide.

3. A builder for a detergent, a detergent, a water treatment agent or a dispersant, comprising the polyalkyleneimine alkyleneoxide copolymer according to claim 1 or the polyalkyleneimine alkyleneoxide copolymer produced by the production method according to claim 2.

* * * * *